May 10, 1966 J. A. VAN ALLAN ETAL 3,250,615

LIGHT-SENSITIVE LAYERS CONTAINING PYRYLIUM AND THIAPYRYLIUM SALTS

Filed Oct. 23, 1961 2 Sheets-Sheet 1

Fig. 1

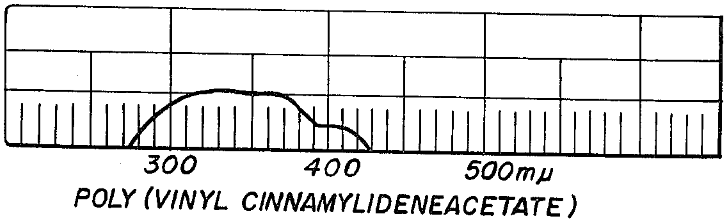

POLY (VINYL CINNAMYLIDENEACETATE)

Fig. 2

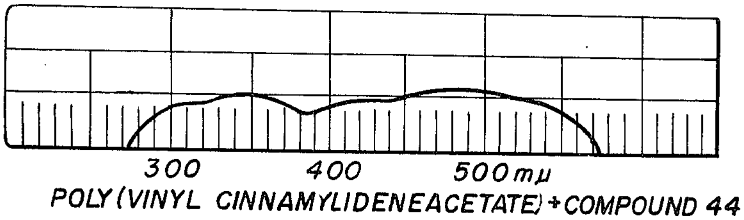

POLY (VINYL CINNAMYLIDENEACETATE) + COMPOUND 44

Fig. 3

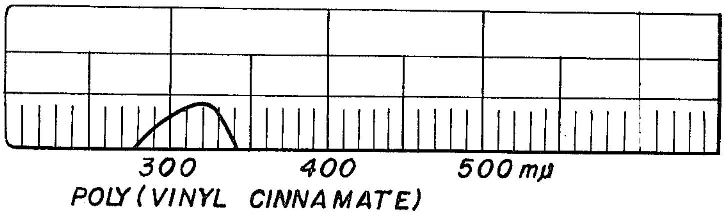

POLY (VINYL CINNAMATE)

Fig. 4

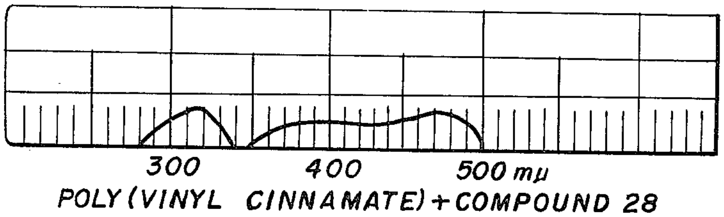

POLY (VINYL CINNAMATE) + COMPOUND 28

James A. Van Allan
Cornelia C. Natale
Frederick J. Rauner
INVENTORS

BY R. Frank Smith
Ray Carter Livermore
ATTORNEY & AGENT

POLY(BUTYLENE CINNAMALMALONATE)

POLY(BUTYLENE CINNAMALMALONATE)+COMPOUND 44

POLY(VINYL ACETATE-CO-AZIDOBENZOATE)

POLY(VINYL ACETATE-CO-AZIDOBENZOATE)+COMPOUND 44

James A. Van Allan
Cornelia C. Natale
Frederick J. Rauner
INVENTORS

BY R. Frank Smith
Ray Carter Livermore
ATTORNEY & AGENT 3,250,615
Patented May 10, 1966

3,250,615

LIGHT-SENSITIVE LAYERS CONTAINING PYRYLIUM AND THIAPYRYLIUM SALTS

James A. Van Allan, Cornelia C. Natale, and Frederick J. Rauner, Rochester, N.Y., assignors to Eastman Kodak Company, Rochester, N.Y., a corporation of New Jersey Filed Oct. 23, 1961, Ser. No. 146,743
11 Claims. (Cl. 96—1)

Figure 5:
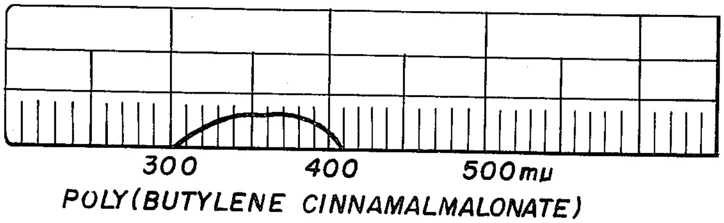

This invention is related to novel light-sensitive polymer layers and more particularly to light-sensitive polymer layers containing a pyrylium or a thiapyrylium salt as a novel class of sensitizers or as a novel class of photoconductors.

Various light-sensitive layers not containing silver halide compounds are well known in the art of making copies of documents, drawings, microfilm images, printed circuits, metal engraving, etc.

For example, various polymer layers, such as albumen, glue, and certain synthetic polymers, such as poly(vinyl alcohol), poly(vinyl cinnamate), etc., are used in making photoresists for metal engraving, the preparation of lithographic plates, printed circuits, etc.

These colloid layers are either inherently light-sensitive or are sensitized by the addition of certain sensitizing compounds. The exposure of these layers to activating radiation alters their physical properties, such as solvent solubility, so that by development with the appropriate solvent a relief image is obtained for printing, for metal etching, etc.

Another type of light-sensitive polymer layer is used in electrophotography. These layers contain a photoconducting material, such as zinc oxide, polyvinyl carbazole, etc., that are nonconductors of electricity before exposure and become electrical conductors upon exposure. Such elements are used in photoconductography where the passage of an electrical current through the conducting areas of the image exposed material produces a visible image, or in xerography where the conducting image produced by exposure to a light image allows an electrostatic charge on the layer to leak-off in an imagewise manner to produce an invisible electrostatic image that can be made visible by applying a xerographic developing composition which has color contrasting with the color of the element. Usually, these developing agents are finely powdered materials.

Although some of the polymers comprising the materials described are inherently light sensitive, their degree of sensitivity is usually low and in the short wave length portion of the spectrum so that it is common practice to add materials to increase sensitivity and to shift the sensitivity toward the longer wave length portion of the visible spectrum. Increasing the sensitivity of such systems into the visible regions of the spectrum has several advantages: it makes available inexpensive and convenient light sources such as incandescent lamps; it reduces exposure time; it makes possible the recording of a wide range of colors in proper tonal relationship, and allows projection printing through various optical systems.

Many of the sensitizers available heretofore have not produced the desired speed increase or shifted the range of sensitivity as far into the longer wave lengths as is desired. Many of the sensitizers are very specific, being effective in one type of photosensitive system and completely ineffective in others.

There is a never ceasing search for new organic photoconductors for use in electrophotographic elements. Many of the prior art sensitizers used in electrophotographic elements that have absorption in the infrared region of the spectrum cannot be used effectively because they greatly increase the dark conductivity, causing them to lose their applied electrostatic charge rapidly in the dark.

It is, therefore, an object of our invention to provide a novel class of sensitizers for photosensitive systems which produces an unusual increase in sensitivity and extends the range of sensitivity into the longer wave lengths of the visible spectrum. Another object is to provide a novel class of sensitizers which are remarkably versatile and produce unusual increases in sensitivity and unusual increases in the range of spectral sensitivity in a number of different photosensitive layers, including a variety of photosensitive polymer coatings as well as organic photoconductor layers and coatings of inorganic semiconductor pigments.

Another object is to provide a new class of sensitizers for electrophotographic elements which absorb in the infrared region of the spectrum and yet which do not substantially increase the dark conductivity causing them to lose their applied electrostatic charge in the dark.

Another object is to provide a novel class of organic photoconductors for incorporation in binder coatings of electrophotographic elements.

Another object is to provide photosensitive layers containing our compounds as novel sensitizers, or novel photoconductors.

Still other objects will be apparent from the following specification and claims.

These and other objects are accomplished by the use of light-sensitive film-forming compositions comprising a polymer and a pyrylium or a thiapyrylium salt compound represented advantageously by the following formula:

I.

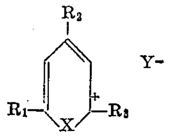

wherein $R_1$, $R_2$ and $R_3$ may each represent an aliphatic group having from 1 to 15 carbon atoms, such as methyl, ethyl, propyl, isopropyl, butyl, tertiary butyl, amyl, isoamyl, hexyl, octyl, nonyl, dodecyl, ethlene, styryl, alkoxystyryl, diethoxystyryl, dimethylaminostyryl, 1-butyl-4-p-dimethylaminophenyl-1,3-butadienyl, $\beta$-ethyl-4-dimethylaminostyryl; an alkoxy group such as methoxy, ethoxy, propoxy, butoxy, amyloxy, hexoxy, octoxy, etc.; aryl, such as phenyl, 4-biphenyl, alkphenyl, such as 4-ethylphenyl, 4-propylphenyl, etc., alkoxyphenyl, e.g., 4-ethoxyphenyl, 4-methoxyphenyl, 4-amyloxyphenyl, 2-hexoxyphenyl, 2-methoxyphenyl, 2-amyloxyphenyl, 3,4-dimethoxyphenyl, etc., $\omega$-hydroxy alkoxyphenyl, e.g., 2-hydroxyethoxyphenyl, 3-hydroxyethoxyphenyl, etc., 4-hydroxyphenyl, halophenyl, e.g., 3,4-dichlorophenyl, 3,4-dibromophenyl, 4-chlorophenyl, 2,4-dichlorophenyl, etc., azidophenyl, nitrophenyl, etc., aminophenyl, e.g., 4-diethylaminophenyl, 4-dimethylaminophenyl, etc.; X is a hetero atom, such as oxygen, sulfur and selenium; and Y is an anionic function.

In addition to the pyrylium and thiapyrylium salts described above, various other modifications can be made such as 2,3,4,6-tetra substituted derivatives, bis pyrylium and thiapyrylium salts such as octamethylene-2,2'-bis[4,6-di(4-methoxyphenyl) pyrylium fluoborate] and derivatives formed from a methyl substituted pyrylium salt and a cyclic ketone such as 2,6-dimethyl-4-pyrone.

The preferred pyrylium and thiapyrylium salts are prepared generally from the reaction of an aromatic aldehyde with a methyl aryl ketone in the presence of an acidic agent, such as boron trifluoride or phosphoryl chloride. The pyrylium salt compounds thus obtained are converted to thiapyrylium salt compounds by treatment with sodium sulfide and an acid.

A wide variety of these salts have been made representing different solubility characteristics and optical absorptions to accommodate various photosensitive systems.

Various photosensitive polymers examined in the past have differed widely in their response to sensitizers. For instance, polymers containing the cinnamic ester function can be readily sensitized by a number of different classes of organic compounds. On the other hand, polymers containing the styryl ketone group (which is very similar in structure to the cinnamic ester group) show little or no response to these sensitizers. It was, therefore, quite surprising that pyrylium and thiapyrylium salts would sensitize all the above-mentioned polymers and, in addition, sensitize elastomers and vinyl polymers. In addition, pyrylium and thiapyrylium salt sensitized coatings of organic and inorganic photoconductors used in electrophotography show high sensitivities when exposed to light. A number of our pyrylium and thiapyrylium salts also have been used to advantage as novel photoconductors in electrophotographic elements.

Among the pyrylium and thiapyrylium salts used according to our invention are the representative examples listed in the table below:

TABLE I

| Compound number | Name of compound |
|---|---|
| 1 | 2,4,6-triphenylpyrylium perchlorate. |
| 2 | 4-(4-methoxyphenyl)-2,6-diphenylpyrylium perchlorate. |
| 3 | 4-(2,4-dichlorophenyl)-2,6-diphenylpyrylium perchlorate. |
| 4 | 4-(3,4-dichlorophenyl)-2,6-diphenylpyrylium perchlorate. |
| 5 | 2,6-bis(4-methoxyphenyl)-4-phenylpyrylium perchlorate. |
| 6 | 6-(4-methoxyphenyl)-2,4-diphenylpyrylium perchlorate. |
| 7 | 2-(3,4-dichlorophenyl)-4-(4-methoxyphenyl)-6-phenylpyrylium perchlorate. |
| 8 | 4-(4-amyloxyphenyl)-2,6-bis(4-ethylphenyl)pyrylium perchlorate. |
| 9 | 4-(4-amyloxyphenyl)-2,6-bis(4-methoxyphenyl)pyrylium perchlorate. |
| 10 | 2,4,6-triphenylpyrylium fluoborate. |
| 11 | 2,6-bis(4-ethylphenyl)-4-(4-methoxyphenyl)pyrylium perchlorate. |
| 12 | 2,6-bis(4-ethylphenyl)-4-(4-methoxyphenyl)pyrylium fluoborate. |
| 13 | 6-(3,4-diethoxystyryl)-2,4-diphenylpyrylium perchlorate. |
| 14 | 6-(3,4-diethoxy-β-amylstyryl)-2,4-diphenylpyrylium fluoborate. |
| 15 | 6-(4-dimethylamino-β-ethylstyryl)-2,4-diphenylpyrylium fluoborate. |
| 16 | 6-(1-n-amyl-4-p-dimethylaminophenyl-1,3-butadienyl)-2,4-diphenylpyrylium fluoborate. |
| 17 | 6-(4-dimethylaminostyryl)-2,4-diphenylpyrylium fluoborate. |
| 18 | 6-(α-ethyl-β,β-dimethylaminophenyl vinylene)-2,4-diphenylpyrylium fluoborate. |
| 19 | 6-(1-butyl-4-p-dimethylaminophenyl-1,3-butadienyl)-2,4-diphenylpyrylium fluoborate. |
| 20 | 6-(4-dimethylaminostyryl)-2,4-diphenylpyrylium perchlorate. |
| 21 | 6-[β,β-bis(4-dimethylaminophenyl)vinylene]-2,4-diphenylpyrylium perchlorate. |
| 22 | 2,6-bis(4-dimethylaminostyryl)-4-phenylpyrylium perchlorate. |
| 23 | 6-(β-methyl-4-dimethylaminostyryl)-2,4-diphenylpyrylium fluoborate. |
| 24 | 6-(1-ethyl-4-p-dimethylaminophenyl-1,3-butadienyl)-2,4-diphenylpyrylium fluoborate. |
| 25 | 6-[β,β-bis(4-dimethylaminophenyl) vinylene]-2,4-diphenylpyrylium fluoborate. |
| 26 | 6-(1-methyl-4-p-dimethylaminophenyl-1,3-butadienyl)-2,4-diphenylpyrylium fluoborate. |
| 27 | 4-(4-dimethylaminophenyl)-2,6-diphenylpyrylium perchlorate. |
| 28 | 2,6-bis(4-ethylphenyl)-4-phenylpyrylium perchlorate. |
| 29 | 2,6-bis(4-ethylphenyl)-4-methoxyphenylthiapyrylium fluoborate. |
| 30 | 2,4,6-triphenylthiapyrylium perchlorate. |
| 31 | 4-(4-methoxyphenyl)-2,6-diphenylthiapyrylium perchlorate. |
| 32 | 6-(4-methoxyphenyl)-2,4-diphenylthiapyrylium perchlorate. |
| 33 | 2,6-bis(4-methoxyphenyl)-4-phenylthiapyrylium perchlorate. |
| 34 | 4-(2,4-dichlorophenyl)-2,6-diphenylthiapyrylium perchlorate. |
| 35 | 2,4,6-tri(4-methoxyphenyl)thiapyrylium perchlorate. |
| 36 | 2,6-bis(4-ethylphenyl)-4-phenylthiapyrylium perchlorate. |
| 37 | 4-(4-amyloxyphenyl)-2,6-bis(4-ethylphenyl)thiapyrylium perchlorate. |
| 38 | 6-(4-dimethylaminostyryl)-2,4-diphenylthiapyrylium perchlorate. |
| 39 | 2,4,6-triphenylthiapyrylium fluoborate. |
| 40 | 2,4,6-triphenylthiapyrylium sulfate. |

TABLE I.—Continued

| Compound number | Name of compound |
|---|---|
| 41 | 4-(4-methoxyphenyl)-2,6-diphenylthiapyrylium fluoborate. |
| 42 | 2,4,6-triphenylthiapyrylium chloride. |
| 43 | 2-(4-amyloxyphenyl)-4,6-diphenylthiapyrylium fluoborate. |
| 44 | 4-(4-amyloxyphenyl)-2,6-bis(4-methoxyphenyl)thiapyrylium perchlorate. |
| 45 | 2,6-bis(4-ethylphenyl)-4-(4-methoxyphenyl)thiapyrylium perchlorate. |
| 46 | 4-anisyl-2,6-bis(4-n-amyloxyphenyl)thiapyrylium chloride. |
| 47 | 2-[β,β-bis(4-dimethylaminophenyl)vinylene]-4,6-diphenylthiapyrylium perchlorate. |
| 48 | 6-(β-ethyl-4-dimethylaminostyryl)-2,4-diphenylthiapyrylium perchlorate. |
| 49 | 2-(3,4-diethoxystyryl)-4,6-diphenylthiapyrylium perchlorate. |
| 50 | 2,4,6-trianisylthiapyrylium perchlorate. |
| 51 | 6-ethyl-2,4-diphenylpyrylium fluoborate. |
| 52 | 2,6-bis(4-ethylphenyl)-4-(4-methoxyphenyl)thiapyrylium chloride. |
| 53 | 6-[β,β-bis(4-dimethylaminophenyl)vinylene]-2,4-di(4-ethylphenyl)pyrylium perchlorate. |
| 54 | 2,6-bis(4-amyloxyphenyl)-4-(4-methoxyphenyl)-thiapyrylium perchlorate. |
| 55 | 6-(3,4-diethoxy-β-ethylstyryl)-2,4-diphenylpyrylium fluoborate. |
| 56 | 6-(4-methoxy-β-ethylstyryl)-2,4-diphenylpyrylium fluoborate. |

Our compounds are valuable as sensitizing agents for enhancing the sensitivity and extending the spectral range of sensitivity of a wide range of film-forming radiation-transparent polymers which may or may not be inherently light sensitive.

These polymers include the polyvinvyl resins, such as the poly(vinyl cinnamate) polymers described by Minsk et al. U.S. 2,610,120, issued September 9, 1952, the polymers having recurring alkapolyenoate groups, e.g., the homopolymers and copolymers of copending Leubner and Unruh U.S. patent application entitled "Novel Light-Sensitive Polymers" filed simultaneously with the immediate application, the polymeric chalcones, e.g., the polymeric chalcones of Allen and Van Allan, U.S. Patent 2,566,302, issued September 4, 1951, the azido polymers, e.g., poly (vinyl acetate-co-azidobenzoate) and many others described in the following paragraphs, the unsaturated esters, e.g., poly(vinyl cinnamalmalonate), poly-(acrylic acid ethyl acrylate), poly(tetramethylene cinnamalmalonate), etc., the esters and amides of the maleic anhydride copolymers of styrene described in Leubner, Williams and Unruh, U.S. Patent 2,816,091, issued December 10, 1957, and Smith, Smith and Unruh, U.S. Patent 2,811,509, issued October 29, 1957, e.g., styrene maleic anhydride copolymer ester of 4-(2-hydroxyethyl)-β-nitrostyrene, etc., polystyrene-co-butadiene, poly(vinyl butyral), poly(vinyl acetophenone), etc., the polyesters, such as those described in Michiels et al., U.S. Patent 2,956,878, issued October 18, 1960, etc.

Especially valuable polymers are those which contain recurring units containing one or more azido groups. Among those azide polymers are those described in Merrill et al., U.S. patent applications, Serial Nos. 525,271 and 525,368, filed July 29, 1955, now Patent Nos. 2,948,670 and 3,096,311 and in Rauner et al., U.S. patent application, Serial No. 18,745, filed March 30, 1960, now Patent No. 3,100,702. Representative azide polymers illustrating those advantageously sensitized according to our invention are described as follows.

Light-sensitive, film-forming azidostyrene homopolymers containing the following recurring structural unit:

II.

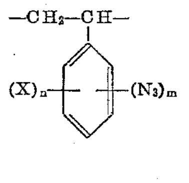

or copolymers of said azidostyrenes consisting of the following recurring structural units in random combination:

III.
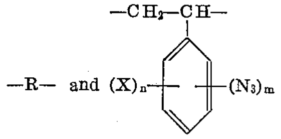
(a) (b)

wherein the ratio of III(*a*) units to III(*b*) units in each resin molecule can vary from 1:19 to 19:1, i.e., III(*b*) are present from 5 to 95 mole percent, and wherein *m* represents in each instance a digit 1 or 2, *n* represents a digit of from 0 to 2, X represents a hydrogen atom, a chlorine atom, an alkyl group containing from 1 to 4 carbon atoms, e.g., methyl, ethyl, propyl, butyl, etc., an alkoxy group containing from 1 to 4 carbon atoms, e.g., methoxy, ethoxy, propoxy, butoxy, etc., and a nitro group, and R represents a unit such as ethylene, isobutylene, a 1,3-butadiene, styrene and substituted styrenes, etc., an α,β-unsaturated mono- or di-carboxylic acid unit such as acrylic acid, an α-alkylacrylic acid, maleic acid, citraconic acid, itaconic acid, etc., and the anhydrides, alkyl esters, imides, N-alkyl imides, nitriles, amides, and N-alkyl and N,N-dialkyl substituted amides of these acids, fumaric and mesaconic acids and their alkyl esters, nitriles, amides and N-alkyl and N,N-dialkyl substituted amides, vinyl alkyl ketones such as vinyl methyl ketone, vinyl halides, such as vinyl chloride, vinylidene halides, such as vinylidene chloride, and the like units, and wherein in each instance in the above the alkyl and alkoxy groups contain from 1 to 4 carbon atoms, by diazotizing a polyaminostyrene or a copolymer of aminostyrene and reacting the resulting diazonium salt with sodium azide, followed by separation of the azido derivative from the reaction mixture. The intermediate aminostyrene polymers can be prepared by nitrating the styrene nucleus of the appropriate styrene polymer and then reducing the nitro derivative to the corresponding amine derivative. Where R in the above structure III is an α,β-unsaturated di-carboxylic acid unit, e.g., a 1:1 copolymer of an azidostyrene and maleic acid, the copolymer can be treated with acetic anhydride to give the maleic anhydride derivative and this can then be reacted with a variety of hydroxyl- and amino-containing components, including hydroxylated azide-containing components which greatly increase the azide content of the polymer molecule, to give the corresponding ester and amide derivatives. In place of the maleic acid-azidostyrene copolymer, there can be employed citraconic or itaconic acid copolymers with the azidostyrene.

To obtain the film-forming, light-sensitive polymers of the invention, wherein the azido grouping is contained in an ester type side chain of the polymer, as in the azidobenzoates of vinyl alcohol polymers represented, for example, by the homopolymers consisting essentially of the following recurring structural unit:

IV.
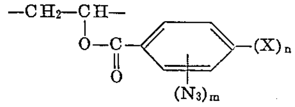

or by copolymers consisting essentially of the following recurring structural units in random combination:

V.
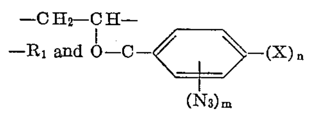
(a) (b)

wherein the ratio of V(*a*) units to V(*b*) in each resin molecule can vary from 1:19 to 19:1, and wherein *m*, *n* and X are as previously defined, and $R_1$ represents a unit such as ethylene, isobutylene, 1,3-butadiene, etc., a vinyl or isopropenyl carboxylic ester, ether, ketone, carbamate or acetal, and the like units, an o, m or p-azidobenzoyl chloride represented by the general formula:

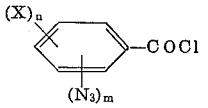

wherein *m*, *n* and X are as above defined, is condensed with a polyvinyl alcohol, a partially hydrolyzed polyvinyl or a polyisopropenyl ester, e.g., partially hydrolyzed polyvinyl acetate, polyvinyl butyrate, polyvinyl benzoate, polyvinyl carbamate, polyvinyl cinnamate, polyvinyl cyanoacetate, polyvinyl azidobenzoate, etc., or with a partially hydrolyzed copolymer of vinyl and isopropenyl esters, or with partial alkyl ethers of polyvinyl alcohol, or with partial polyvinyl acetals. The free hydroxyl groups in each instance can be partially or substantially completely esterified, as desired, with the azidobenzoyl chloride reactant. Where the esterification of a partially hydrolyzed polyvinyl acetate with azidobenzoyl chloride is incomplete, the final light-sensitive polymer product may contain more than two different units making up the structure such as vinylazidobenzoate units, vinyl acetate units and vinyl alcohol units.

In place of the azidobenzoyl chloride, there may be employed an azidonaphthoyl chloride, azidophenylacyl chlorides, such as o-, m- or p-azidophenylacetyl chloride, etc., an azidocinnamoyl chloride, and the like, to give the corresponding polymeric derivatives of the above-mentioned hydroxyl-containing polymers. The mentioned azido-group-containing acid chlorides are also capable of condensing with other hydroxylic polymeric materials, for example, with naturally occurring materials, such as cellulose, starch, guar, alginic acid or with their partially esterified or etherified derivatives to give other operable light-sensitive polymers. The said acid chlorides are capable of condensing also with polymeric materials containing amino groups having free hydrogen atoms, for example, with synthetic polymers, such as polyvinylamine, polyvinyl anthranilate polymeric aminotriazoles, etc., as well as with naturally occurring polymers, such as gelatin, to give the corresponding light-sensitive amide derivatives.

To obtain the film-forming, light-sensitive polymers of the invention wherein the azido grouping is contained in a different ester type of side chain of the polymers, as in the azidophthalates of vinyl alcohol polymers represented, for example, by homopolymers consisting essentially of the following recurring structural unit:

VI.
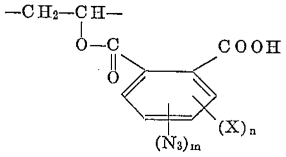

or by copolymers consisting essentially of the following recurring structural units in random combination:

VII.
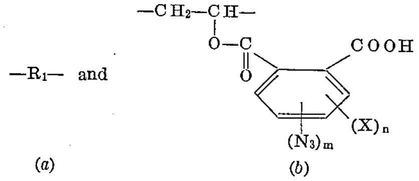
(a) (b)

wherein the ratio of VII(*a*) units to VII(*b*) units in each resin molecule can vary from 1:19 to 19:1, and wherein *m, n,* X and $R_1$ are as previously defined, an o-, m- or p-azidophthalic anhydride is condensed with a hydroxylic polymer such as mentioned in the process for preparing the light-sensitive polymers of structures IV and V. The azidophthalic anhydride can be substituted by various azidonaphthalic anhydrides. Also, the azidophthalic and azidonaphthalic anhydrides may be condensed with amino-group-containing synthetic polymers, such as polyvinylamines, polyvinyl anthranilates, polymeric aminotriazoles, etc., and proteins, such as gelatin, casein, etc., to give the corresponding light-sensitive amide derivatives.

To obtain the film-forming, light-sensitive polymers of the invention wherein the azido grouping is contained in a still different ester type of side chain of the polymer as in the esters of azidophenylalkanols with maleic anhydride copolymers consisting essentially of the following recurring structural unit:

VIII.

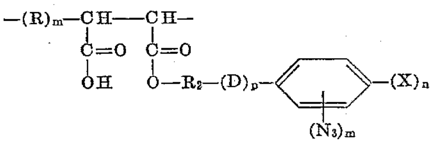

wherein *m, n,* X and R are as previously defined, $R_2$ represents an alkylene group containing from 1 to 4 carbon atoms, such as $—CH_2—$, $—CH_2CH_2—$, etc., D represents an atom of oxygen, an atom of sulfur, an imino group or an alkylimino group and *p* represents a digit 0 or 1, a hydroxylated azido-group-containing compound, such as an o-, m- or p-azidophenylalkanol, such as represented by the general formula:

IX.

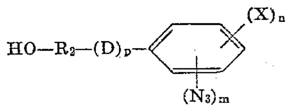

wherein *m, n,* X, $R_2$, D and *p* are as previously defined, is condensed with a maleic anhydride copolymer, preferably with a 1:1 styrene-maleic anhydride copolymer. As typical azidobenzylalkanols, there may be employed, for example, p-azidobenzyl alcohol, o-azidobenzyl alcohol, m-azidobenzyl alcohol, 2-(azidophenyl)ethanol, an azidophenoxyethanol, an aliphatic hydroxylated azido compound, such as 2-azidoethanol or 2-azido-2-phenylethanol to give the corresponding light-sensitive esters. Also, the maleic anhydride copolymer can be replaced by polyacrylic or polymethacrylic anhydrides to give generally similar light-sensitive polymers with the said hydroxylated azido group containing compounds.

To obtain the film-forming, light-sensitive polymers of the invention wherein the azido grouping is contained in an acetal group attached to a polymer chain, as in polyvinyl azidobenzalacetals consisting essentially of the following recurring structural unit:

X.

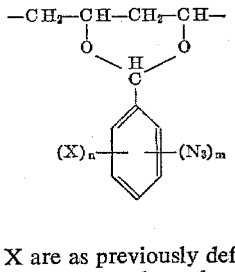

wherein *m, n* and X are as previously defined, a polyvinyl alcohol or a carboxylic ester thereof, such as polyvinyl acetate, polyvinyl butyrate, etc., is condensed, in the presence of an acid catalyst with an azidobenzaldehyde represented by the general formula:

XI.

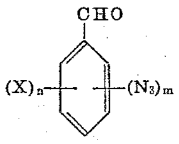

wherein *m, n* and X are as previously defined. The intermediate azidobenzaldehydes can be prepared, in general, by the method described by M. O. Forster and H. M. Judd, J. Chem. Soc. 97, page 254 (1910), wherein an aminobenzaldehyde is diazotized and then treated with sodium azide to give the corresponding azidobenzaldehyde. Where the polyvinyl alcohol is only partly acetalized, the final light-sensitive polymeric product will also contain some unreacted hydroxyl groups and, in the case where a polyvinyl ester is employed as the initial polymeric material and is only partially acetalized, the final light-sensitive polymer may contain both acetal and ester groups. It is also within the invention to employ partially hydrolyzed polyvinyl esters and to only partially acetalize the available hydroxyl groups. The above-described light-sensitive polymeric products containing residual or unreacted hydroxyl groups can advantageously be further modified by acylation with acid chlorides or anhydrides or by carbamylation with isocyanates. For instance, a partial polyvinyl azidobenzalacetal may be acetylated, maleylated, succinoylated, phthaloylated, benzoylated, cinnamoylated, etc.

In using our compounds to enhance the sensitivity and spectral range of sensitivity of inherently light-sensitive polymeric materials, the sensitizer is added to the polymer dope, that is, a solution of the polymer in a suitable solvent. The dope solvent chosen is an organic solvent, such as methyl Cellosolve acetate, acetone, 2-butanone, cyclohexanone, etc., or mixtures of these solvents in which both sensitizer and polymer are soluble.

Our pyrylium and thiapyrylium salts can be added to the polymer not only by incorporation with solvents as described to prepare coating dopes but also by other methods such as melting the polymer and salt together.

The following will illustrate with typical examples the use of our pyrylium and thiapyrylium salt compounds as sensitizers in polymer layers.

*Example I*

A 2 percent solution of poly(vinyl acetate-co-azidobenzoate) (1:1) in cyclohexanone was prepared. A sample of this unsensitized polymer was whirl coated at 78 revolutions per minute on silicated, grained aluminum sheets.

Other samples of the unsensitized coating material were sensitized by adding 10 percent sensitizer based on the weight of polymer present. In this manner, separate samples of the poly(vinyl acetate-co-azidobenzoate) were sensitized with representative sensitizing compounds of our invention and coated as described above.

Each of the coated samples were exposed to a 95 amp. carbon arc at 4 feet through a silver step wedge having .15 log exposure increments between consecutive steps. The unexposed areas were washed-off developed in cyclohexanone for 2 minutes followed by a one-minute rinse. Sample strips of the developed material were dyed in Kodak Photoresist Dye Bath. Relative speed values were calculated based on a comparison of the number of visible steps comprising the dye image in each sample with the visible steps of dyed image produced in an unsensitized poly(vinyl cinnamate) coating, given a relative speed of 1.

Spectral sensitivity data were acquired for each of the sample coatings made above by exposing them in a *f*/4.4 spectrograph made from a converted Bausch and Lomb monochromator. The light source was an 800-watt xenon arc lamp.

The following table lists the relative speed values and spectral ranges determined for these coatings.

TABLE II

| Compound number | Relative speed | Spectral sensitivity range, mμ |
|---|---|---|
| None | 25 | 270-380 |
| 1 | 2,512 | 270-480 |
| 2 | 1,122 | 270-360 |
| 3 | 1,100 | 270-360 |
| 4 | 631 | 270-480 |
| 5 | 140 | 270-400 |
| 6 | 100 | 270-385 |
| 7 | 100 | 270-390 |
| 8 | 450 | 270-510 |
| 9 | 80 | 280-500 |
| 10 | 450 | 270-480 |
| 11 | 450 | 270-500 |
| 12 | 450 | 270-510 |
| 30 | 3,500 | 270-500 |
| 31 | 2,240 | 270-525 |
| 32 | 1,000 | 270-560 |
| 33 | 891 | 270-580 |
| 34 | 891 | 270-500 |
| 35 | 794 | 270-550 |
| 36 | 650 | 280-520 |
| 37 | 650 | 270-550 |
| 44 | 220 | 280-580 |
| 39 | 1,300 | 280-490 |
| 40 | 900 | 270-490 |
| 41 | 450 | 270-520 |
| 42 | 900 | 270-490 |
| 43 | 220 | 260-560 |
| 45 | 900 | 270-540 |

The data show that the relative speed of unsensitized poly(vinylacetate-co-azidobenzoate) was increased up to 140 times by the addition of our compounds as sensitizers. In addition to this, the spectral range of sensitivity was extended from 270–380 mμ to as high as 270–580 mμ or almost tripled. These improvements in sensitivity produced in these polymer systems by using our sensitizers makes them valuable for projection printing in which a small original image is enlarged by projection to produce enlarged reproductions.

Similarly, our sensitizers are used to advantage in coatings of polymers containing a plurality of aromatic azide groups.

Similarly, our sensitizers are used to advantage in photopolymerization systems based on vinyl monomers, such as acrylamide, methylenebisacrylamide, methyl acrylate, acrylonitrile, and the like, and based on polymers containing unsaturated groups, such as is described in Martin, U.S. Patent 2,929,710, issued March 22, 1960.

The following example illustrates the use of our compounds as sensitizers in polymers containing a cinnamalacetyl group, such as poly(tetramethylene cinnamalmalonate).

*Example II*

A 2 percent solution of poly(tetramethylene cinnamalmalonate) was made in a 1:9 cyclohexanone, methyl Cellosolve acetate mixture. Coatings were made, exposed and developed as in Example I to show the effect of representative compounds of our invention as sensitizers. Relative speed values and spectral sensitivity ranges were determined for the coatings as described in Example 1 and are tabulated below.

TABLE III

| Compound number | Relative speed | Spectral sensitivity range |
|---|---|---|
| None | 320 | 310-410 |
| 8 | 800 | 300-490 |
| 36 | 2,200 | 300-530 |
| 37 | 2,200 | 300-540 |
| 39 | 1,800 | 280-510 |
| 44 | 3,200 | 300-580 |

From these data it may be seen that the relative speed is increased up to 10 times and the spectral sensitivity range is increased up to 2.8 times by using our compounds as sensitizers.

The following example will illustrate how a typical polymer, such as poly(tetramethylene cinnamalmalonate) was sensitized with one of our compounds and used in making a printed circuit.

*Example III*

A coating formulation was prepared that had the following composition:

| Constituents: | | Amount |
|---|---|---|
| Poly(tetramethylene cinnamalmalonate) | g | 10 |
| Methyl Cellosolve acetate | cc | 80 |
| Cyclohexanone | do | 20 |
| Compound 44 | g | 0.20 |

A sample of this formulation was flow coated on copper clad laminate and left to dry in a near vertical position under room conditions. The coated material was projection printed with a 500-watt projector having a 5-inch, f/2.8 lens set to produce a 5× enlargement of the original image of a printed circuit. The exposed material was developed in a vapor degreaser, then etched in a 42 Be-ferric chloride solution to produce a circuit pattern of copper on the phenolic backing.

*Example IV*

Whirl-coatings on aluminum were made from dopes of 2 percent polymer and 0.2 percent compound No. 37. With Pliolite NR, a cyclized rubber made by Goodyear Tire and Rubber Co., exposure through a 0.15 density step wedge to a sunlamp at ten inches for ten minutes followed by development in benzene and dyeing with a Kodak Photoresist Dye Bath showed five steps. Pliolite S–7 (a polystyrene:butadiene product made by Goodyear Tire and Rubber Co.) so sensitized gave two steps after ten minutes' exposure. Without the sensitizer, neither polymer gave an image. This example illustrates the use of our compounds as sensitizers for certain nonlight-sensitive or slightly light-sensitive polymers.

*Example V*

A coating was made as in Example IV of a composition containing 2 percent polymer and .2 percent sensitizer compound in a solvent or solvent mixture as indicated in the table below.

TABLE IV

| Compound | Solvent | Polymer |
|---|---|---|
| 31 | Methyl ethyl ketone | Pliolite S-5B (Goodyear Tire and Rubber Co.). Approx. 70:30 polystyrene:butadine. |
| 44 | do | Do. |
| 50 | do | Do. |
| 45 | Benzene | Pliolite S-7. |
| 44 | do | Do. |
| 44 | Xylene | Pliolite NR. |
| 44 | Benzene | Shell polycis-isoprene. |
| 31 | Dichloroethane | Copolycarbonate of Bisphenol A, divanillalcyclopentanone and neopentyl bischloroformate. |
| 44 | do | Do. |
| 50 | do | Do. |
| 45 | Mixtures of methyl ethyl ketone and cyclohexanone. | Acetal of p-methacrylyloxybenzaldehyde and poly (vinyl alcohol). |
| 44 | do | Do. |
| 50 | do | Do. |
| 44 | Cyclohexanone | Acetal of 4-formylcinnamic acid and partially acetylated poly (vinyl alcohol). |
| 50 | do | Do. |
| 45 | Mixture of acetone, water and cyclohexanone. | Esterification product of polystyrene-maleic anhydride with 4 parts of p-hydroxyethoxybenzal-p′-carboxymethoxyacetophenone and 1 part of p-hydroxyethoxybenzalanisalacetone. |

After drying, each coated sample was exposed to light through a 0.15 log exposure step wedge and developed with the appropriate solvent. Each sample was found to have a photographic speed that was higher than a corresponding sample of unsensitized polymer coating, as evidenced by rate of insolubilization or formation of a visible image or both, or was found to have an extended spectral sensitivity. Some samples showed both increased speed and extended spectral sensitivity.

In another embodiment of our invention our pyrylium and thiapyrylium salts are used as senstitizers for electrophotographic coatings. Our pyrylium and thiapyrylium salt compounds are used to advantage as sensitizers in any of the electrophotographic elements described in the prior art. In general, the electrophotographic element consists of a conductive material such as paper, a metal plate, e.g., brass, aluminum, zinc, etc., or nonconductive materials, such as glass, any of the plastic sheet materials, etc., which have been made conductive by a thin coating of a metal foil, such as aluminum foil, etc., other materials, such as zinc oxide, carbon, etc., over which is coated a photoconductive layer. Electrically insulating supports, for example, plastic sheeting, such as from cellulose acetate, Mylar (a polyethylene terephthalate resin made by Du Pont), polycarbonate, and the like, are also useful when processed according to the sequence of D. C. Hoesterey U.S. 106,731, filed May 1, 1961, entitled "Processing Sequence for Electrophotography."

The photoconductive layer of a xerographic element may comprise a thin, continuous layer of an organic compound, such as anthracene, anthraquinone, polyvinyl carbazole, or inorganic substances, such as selenium, vitreous sulfur, etc., or it may consist of a compound, such as cadmium sulfite, arsenic sulfide, zinc cadmium oxide, zinc oxide and various mixtures of these, etc., which is coated as discrete particles in a binder. The photoconductive layer of an element designed for photoconductography may comprise a thin layer of zinc oxide coated as discrete particles in a resinous binder. Various resins may be used as a binder for either type of element. These resins include polymers, such as the polyvinyl resins, for example, the polystyrenes, the polyvinyl acetates, polyvinyl chlorides, etc., the silicone resins, cellulose esters and cellulose resins, polyesters, polycarbonates, and acrylic resins. These resins must have good electrical insulating properties.

Representative compounds of our invention absorb in the infrared region of the spectrum, however, they do not cause the charged electrophotographic layers to lose the applied electrostatic charge in the dark.

*Example VI*

168 g. of New Jersey Zinc "XX 78" zinc oxide was blended with 238 g. of commercial xylene in a water jacketed blender. 60 cc. of xylene containing $4.5 \times 10^{-3}$ equivalents of trimethylchlorosilane was added slowly with thorough mixing. The slurry was mixed for 10 minutes and then 5.1 g. of dichloromethane containing our compound used as a sensitizer (at the concentration listed below in terms of moles per $10^7$ g. of zinc oxide) was added, and the mixture stirred for 5 minutes. Then 14.4 g. of General Electric Company's silicone resin SR–82 were added and the mixture stirred for 1 minute. Then 111.9 g. of poly(n-butyl/isobutyl methacrylate) was added and the mixture stirred for 2 minutes. At the end of this time, the mixture was coated on paper and dried.

A xerographic coating as described was made for each of our compounds listed in Table V. Also, an unsensitized coating was made. Each of these coatings was given identical exposure to a silver step wedge having .10 log exposure increments between consecutive steps, then given identical development with a xerographic developer, and a speed value was determined from the developed image.

The xerographic element in Example VI was developed or toned by brushing the exposed coating with a mixture of iron filings containing 4 percent by weight of toner particles until optimum optical density, judged visually under a safe light, was obtained. The toner powder was made by milling together Piccolastic resin D125 (a styrene polymer made by Pennsylvania Industrial Chemical Corp.) with carbon black, spirit soluble nigrosine and Iosol Black, a dye made by National Aniline Division of Allied Chemical and Dye Corp.

The photoelectric speed values given in this example and in Examples 7 and 10 are based on the following arbitrary speed scale. The relative speed value of 20 was given to a coating when 57 foot candle seconds of illumination from a 3000° K. tungsten source reduced an applied electrostatic charge just to the point where no toner would be held by the coating on development. Thus, a coating which required twice this amount of illumination or 114 foot candle seconds to discharge would have a relative speed of 10 and coatings requiring less than 57 foot candle seconds would have speed values greater than 20.

TABLE V

| Compound number | Moles of compound used per $10^7$ g. of zinc oxide | Photoelectric speed of xerographic zinc oxide coating |
|---|---|---|
| 13 | 5.8 | 489 |
| 55 | 1.0 | 241 |
| 15 | 1.0 | 620 |
| 16 | 1.0 | 192 |
| 17 | 1.0 | 241 |
| 18 | 1.0 | 304 |
| 19 | 1.0 | 620 |
| 20 | 1.0 | 393 |
| 21 | 1.0 | 792 |
| 22 | 1.0 | 1,290 |
| 23 | 1.0 | 489 |
| 24 | 1.0 | 620 |
| 25 | 1.0 | 792 |
| 26 | 1.0 | 241 |
| 46 | 5.8 | 489 |
| 47 | 1.0 | 792 |
| 48 | 1.0 | 489 |
| 49 | 1.0 | 241 |
| 50 | 1.0 | 241 |

From these data, it may be seen that the speed of our sensitized xerographic elements is as much as 21 times faster than the speed of unsensitized xerographic elements.

The following examples will illustrate the use of one of our compounds as a sensitizer in electrophotographic elements.

*Example VII*

Photoconducting compositions were made for representative compounds. The compound was dissolved in 5.0 g. of dichloromethane and 57 g. of toluene. Six grams of polyvinyl carbazole was dissolved in this solution, which was then coated onto paper with a 0.002 inch coating knife. The coating block was maintained at 130° F. to promote rapid drying. An unsensitized coating as well as a sensitized coating was made containing our compounds at the concentration indicated in Table VI.

Each coating was charged under a negative corona, developed and its xerographic speed determined in the manner described in Example VI. The speeds determined are listed in the following table.

TABLE VI

| Compound number | Moles of compound per 100 moles of nitrogen present in system | Speed |
|---|---|---|
| None | ---------- | 0.03 |
| 51 | 0.5 | 12 |
| 51 | 1.0 | 30 |
| 30 | 0.5 | 15 |
| 30 | 1.0 | 24–30 |
| 30 | 2.0 | 40 |
| 31 | 0.5 | 80 |
| 31 | 1.0 | 130 |
| 31 | 2.0 | 160 |
| 45 | 0.5 | 30 |
| 45 | 1.0 | 60 |
| 45 | 2.0 | 100 |
| 29 | 0.5 | 50 |
| 29 | 1.0 | 60 |
| 29 | 2.0 | 122 |
| 52 | 0.5 | 31, 40 |
| 52 | 1.0 | 60, 60 |
| 52 | 2.0 | 80, 151 |
| 37 | 0.5 | 80 |
| 37 | 1.0 | 130 |
| 37 | 2.0 | 200 |
| 44 | 0.5 | 50 |
| 44 | 1.0 | 80 |
| 44 | 2.0 | 60 |
| 54 | 0.5 | 60 |
| 54 | 1.0 | 100 |
| 54 | 2.0 | 151 |
| 35 | 0.5 | 80 |
| 35 | 1.0 | 162 |
| 35 | 2.0 | 200 |
| 14 | 0.5 | 122 |
| 14 | 1.0 | 151 |
| 14 | 2.0 | 241 |
| 55 | 0.5 | 100 |
| 55 | 1.0 | 170 |
| 56 | 0.5 | 170 |
| 56 | 1.0 | 260 |
| 38 | 0.5 | 31 |
| 15 | 0.5 | 40 |
| 53 | 0.5 | 70 |

*Example VIII*

To a slurry of 150 g. of zinc oxide in 330 cc. of toluene was added dropwise 60 cc. of a toluene solution containing $5\times10^{-4}$ moles of dodecyltrichlorosilane. The mixture was stirred, then a solution containing 0.0389 g. of compound 50, 2,4,6-trianisylthiapyrylium perchlorate, in 10 cc. of methanol and 12.4 cc. of dichloromethane was added. This was mixed further and 10 g. SR–82 (General Electric silicone resin, 60 percent solid material in toluene) was added to the slurry, followed by 80 g. of a 30 percent solids solution of Pliolite S–7 (a high styrene-butadiene copolymer made by Goodyear Tire and Rubber Company) binder and further mixing. The completed mixture containing 30 percent solids with a 5/1 pigment binder ratio was coated with a 0.008-inch knife onto aluminum laminated paper and dried. This material was exposed to light through a silver step wedge image described previously and developed by a photoconductographic process. A comparison of the developed image with the image produced by identical exposure and development in another sample of the photoconductographic material that was unsensitized showed that approximately 60 times less light from a tungsten source was required by the thiapyrylium salt sensitized coating than was required by the unsensitized coating to produce the same developed image.

In Example VIII, the photoconductographic element was exposed through the silver step wedge to light of 400 foot-candle intensity for 5 seconds and then developed with 80 volts D.C. current between the development sponge and the aluminum with a developer of sodium thiosulfate saturated with silver chloride.

Not only are our pyrylium and thiapyrylium salt compounds used as novel sensitizers in electrophotographic elements, but they are also used advantageously as a novel class of photoconductors. The following example will illustrate the value of our compounds as photoconductors by comparing their photoconductivity with the photoconductivity of polyvinylcarbazole.

*Example IX*

A 1:1 slurry of the organic photoconductor compound in a binder was coated as a 20 percent mixture in tetrahydrofuran 0.008 inch thick onto paper, dried and conditioned overnight in the dark. Such coatings were made in each of the following individual binder materials: (1) polystyrene; (2) poly(vinyl chloride vinyl acetate); and (3) poly(isobutyl methacrylate), i.e., Lucite 45 made by Du Pont Company.

The photoconductivity of these coatings was compared with the photoconductivity of a polyvinylcarbazole coating prepared by coating a 5% solution in a 32/68 mixture of tetrahydrofuran/toluene .008 inch thick on paper.

The photoconductivity of these samples was measured by first charging, measuring the surface potential and its change with time in the dark (the dark decay) using an electrometer, and then measuring the change in surface potential as the charged coating was exposed to a source of illumination rich in ultraviolet light. The difference between the slope of the photodecay curve and the slope of the dark decay curve gave as value for the photoproduced discharge. The ratio of this difference for a given sample divided by this difference for the standard polyvinylcarbazole coating was called the R value of the coating. These values are tabulated below for the compounds in the different binders.

The (+) or (−) sign superscript to R indicates the polarity of the corona.

Table VII

| Compound number | $R^+$ | | | $R^-$ | | |
|---|---|---|---|---|---|---|
| | Binder number | | | | | |
| | 1 | 2 | 3 | 1 | 2 | 3 |
| 2 | 6.5 | 2.0 | 3.4 | 25 | -------- | 25 |
| 27 | -------- | 11.3 | -------- | -------- | 10.0 | -------- |
| 31 | 0.1 | 0 | -------- | 1.0 | 2.5 | -------- |
| 35 | -------- | 10.0 | -------- | -------- | 50.0 | -------- |
| 36 | 1.8 | 0 | 0.38 | 6.0 | -------- | 1.3 |
| 36 | 27.0 | 10.0 | 17.0 | 50.0 | 6.3 | 20.0 |

*Example X*

Xerographic coatings were made in which the concentration of 2,6-bis(p-ethylphenyl)-4-(p-n-amyloxyphenyl)-thiapyrylium perchlorate used as a photoconductor was varied from 0.75 to 35 percent of the total solids in the mix. A copolymer of polyethylene terephthalate and polyethylene isophthalate (about 3:2) was the binder. The coatings were given a negative charge, exposed to an image and developed with the toner described in Example VI. Photoelectric speeds, determined in the manner described in Example VI, increased from 0.5 for 0.75 percent thiapyrylium salt to 250 for 35 percent thiapyrylium salt.

The amounts of the pyrylium or thiapyrylium salt compounds used in sensitizing a polymer, or a photoconductor in a light-sensitive layer will vary somewhat from compound to compound, according to the particular polymer or photoconductor used and according to the effect desired. The regulation and adoption of the most economical and useful proportions will be apparent to those skilled in the art upon making the ordinary observations and tests customarily employed in the art. Accordingly, the foregoing procedures and proportions are to be regarded only as illustrative. Clearly our invention is directed to any of the film-forming polymers containing our pyrylium or thiapyrylium salts as sensitizers for the polymer or as a sensitizer for a photoconductor, or as a photoconductor itself.

Our novel film-forming compositions contain from 0.0001 to 50 percent of our pyrylium and thiapyrylium salts based on the weight of the radiation-transparent polymer. The useful range for these salts as photoconductors is from about 1 to 50 percent while the preferred range is from about 10 to 50 percent by weight of the polymer. The useful range of our salts as sensitizers for photoresist elements and electrophotographic elements is from 0.0001 to 30 percent while the preferred range is from about 0.002 to 10 percent by weight of polymer in the film-forming composition.

Our invention is still further illustrated by a description of the synthesis of our pyrylium and thiapyrylium salts.

The published methods for the preparation of pyrylium salts are summarized as follows:

A. From 1,5-diketones or dialdehydes

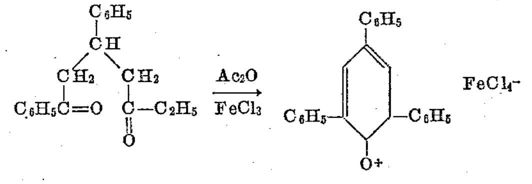

I II

This type of oxidative ring colsure may also be accomplished with $SbCl_5$, $POCl_3$, $Ac_2O+HClO_4$. A variation of this reaction consists of the reaction of a chalcone with a methyl aryl ketone in the presence of a condensing agent to give a pyrylium salt.

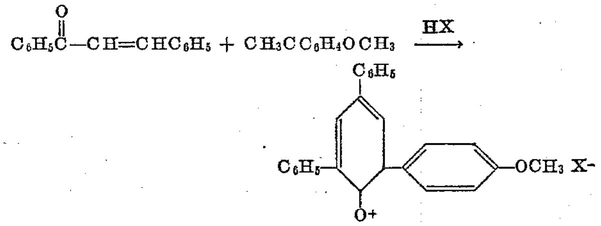

III or alternatively two molecular equivalents of a methyl arylketone may be condensed with one of an aldehyde to give an isomeric product IV.

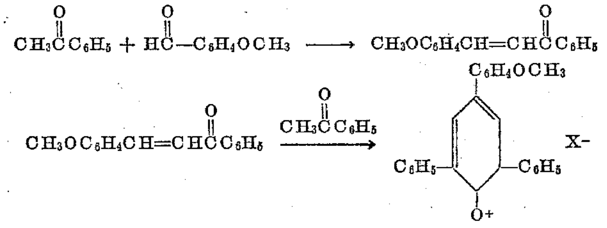

IV

B. From α,β-unsaturated methyl ketones and mixed anhydrides.

This reaction is illustrated by the reaction of mesityl oxide with the mixed anhydride of acetic and perchloric acids.

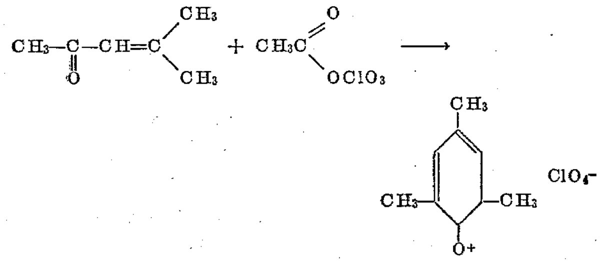

C. From olefins and acid chlorides.

Olefins react with two moles of an acid chloride in the presence of aluminum chloride to give 2,4,6-pyrylium salts in yields of 20–40 percent. This synthesis is particularly useful in the preparation of pyrylium salts with branched aliphatic chains in the 2- and 6-positions.

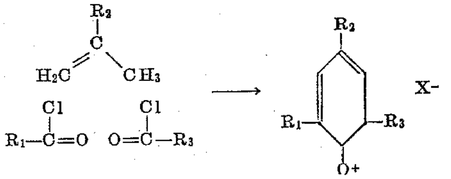

We have now found that the procedure just described in A, B and C can be carried out using boron trifluoride etherate as the condensing agent. The use of this reagent (1) gives improved yields of the pyrylium salts, (2) affords synthetic methods that are more readily and economically carried out, and (3) yields compounds that cannot be prepared when other condensing agents are used.

The preparative method outlined in A above has been divided into three procedures.

D. (1) Reaction of an aldehyde with two equivalents of a methyl ketone in the presence of boron trifluoride etherate, (2) Reaction as in method (1) but employing an equivalent of nitrobenzene and three equivalents of the ketone, and (3) Reaction of benzaldiacetophenone with boron trifluoride etherate.

The yields obtained by procedure D(1) are in the order of 30–40 percent in contrast to about 20 percent using other condensing agents. This reaction is more readily carried out than by the published procedure, and the product is obtained in purer form. The inclusion of an oxidizing agent, such as nitrobenzene, increases the yield of the pyrylium salt to 40–50 percent. If this benzaldiacetophenone is cyclized with boron trifluoride etherate, the yield of pyrylium salt is raised to 60–75 percent.

The scope of reaction D(1) has been greatly extended by the substitution of an anhydride or an acid chloride for the aldehyde moiety. Thus acetic, propionic, butyric, hexanoic, heptanoic anhydrides, as well as lauroyl chloride have been used in place of benzaldehyde in reaction D(1) to produce methyl, ethyl, propyl, amyl, hexyl, and undecanyl diphenylpyrylium fluoborates.

The anion function is not critical to the performance of the pyrylium and thiapyrylium salts of our invention, it being derived from the particular acidic condensing agent used in the preparation of the said salts or by subsequent simple metathesis with an anion of another acid. Representative anion functions, for example, include perchloriate, fluoborate, nitrate, chloride, bromide, chloroaluminate, chloroferrate, sulfate, bisulfate, sulfacetate, methosulfate, alkanoates such as acetate, and especially trifluoroacetate, trichloroacetate, etc., aromatic sulfonates such as p-toluene sulfonate, etc., anions from aromatic carboxylic acids such as benzoate, and especially p-nitrobenzoate, 2,4-dinitrobenzoate, the trinitrobenzoates, and the like.

Any of the pyrylium salts can be converted to the corresponding thiapyrylium salt by treatment with sodium sulfide, Compounds 1 and 2 were prepared as described in Helv. Chim. Acta. 39, 13 (1956).

Compound 3 was prepared by condensing two molar equivalents of acetophenone with one molar equivalent of 2,4-dichlorobenzaldehyde.

Compound 4 was prepared as Compound 3 but using 3,4-dichlorobenzaldehyde in place of the 2,4-dichlorobenzaldehyde.

Compound 5 was prepared by condensing p-methoxyacetophenone with benzaldehyde.

Compound 6 was prepared as described in Helv. Chim. Acta. 39, 19 (1956).

Compound 7 was prepared by reacting one molar equivalent of 4-methoxychalcone with one molar equivalent of 3,4-dichloroacetophenone.

Compound 8 was prepared by reacting one molar equivalent of 4-amyloxybenzaldehyde with two molar equivalents of 4-ethylacetophenone.

Compound 9 was prepared by condensing one molar equivalent of 4-amyloxybenzaldehyde with two molar equivalents of 4-methoxyacetophenone.

Compound 10 was prepared by heating on a steam bath for one hour a mixture of 5.3 g. (0.05 mole) of benzaldehyde, 12 g. (0.1 mole) of acetophenone, 7 g. of nitrobenzene, and 20 ml. of boron trifluoride etherate. The mixture was then poured into 300 ml. of ether. The yellow solid was collected and recrystallized from ethanol to yield 8.5 g. of 2,4,6-triphenylpyrylium fluoborate, M.P. 245°.

Compounds 11 and 12 were prepared by condensing one molar equivalent of 4-methoxybenzaldehyde with two molar equivalents of 4-ethylacetophenone in the presence of $POCl_3$ and $BF_3$ etherate, respectively.

Compound 13 was prepared by condensing equimolar amounts of 6-methyl-2,4-diphenylpyrylium perchlorate with 3,4-diethoxybenzaldehyde.

Compound 14 was prepared by condensing 6-hexyl-2,4-diphenylpyrylium floroborate with 3,4-diethoxybenzaldehyde. The 6-hexyl-2,4-diphenylpyrylium fluoborate was prepared by condensing 2 molar equivalents of acetophenone with one molar equivalent of heptanoic anhydride in the presence of boron trifluoride.

Compound 15 was prepared by condensing equimolar amounts of 6-propyl-2,4-diphenylpyrylium fluoborate and 4-dimethylaminobenzaldehyde.

Compound 16 was prepared by condensing equimolar amounts of 6-hexyl-2,4-diphenylpyrylium fluoborate and 4-dimethyl-aminocinnamaldehyde. The pyrylium salt reactant was prepared by reacting two molar equivalents of acetophenone with one equivalent of heptanoic anhydride in the presence of boron trifluoride etherate.

Compound 17 was prepared as 16, but using 6-hexyl-2,4-diphenylpyrylium fluoborate and 4-dimethylaminobenzaldehyde.

Compound 18 was prepared by condensing equimolar amounts of 6-n-propyl-2,4-diphenylpyrylium fluoborate and 4,4'-bis(dimethylamino)benzophenone.

Compound 19 was prepared as 16 using 6-amyl-2,4-diphenylpyrylium fluoborate.

Compound 20 was prepared as 17 but using the pyrylium perchlorate salt instead of the fluoborate.

Compound 21 was prepared by condensing equimolar amounts of 6-methyl-2,4-diphenylpyrylium perchlorate and 4,4'-bis(dimethylamino)benzophenone.

Compound 22 was prepared by condensing one molar equivalent of 2,6-dimethyl-4-phenyl pyrylium perchlorate with two equivalents of 4-dimethylaminobenzaldehyde.

Compound 23 was prepared from 6-ethyl-2,4-diphenylpyrylium fluoborate and 4-dimethylaminobenzaldehyde.

Compound 24 was prepared as 16 but using 6-propyl-2,4-diphenylpyrylium fluoborate.

Compound 25 was prepared as 21 but using the corresponding pyrylium fluoborate as a starting material.

Compound 26 was prepared as 24 using 6-ethyl-2,4-diphenylpyrylium fluoborate.

Compound 27 was prepared by condensing two molar equivalents of acetophenone with one molar equivalent of 4-dimethylaminobenzaldehyde in the presence of perchloric acid.

Compound 28 was prepared as 27 but using 4-ethylacetophenone and benzaldehyde.

Compounds 29, 30, 31, 32, 33, 34, 36, 37, 39, 40, 41, 42, 45, 47, 48, 52, 49, 38 and 44 were prepared by treating the corresponding pyrylium salt compounds 12, 1, 2, 6, 5, 3, 28, 8, 10, 1, 2, 1, 11, 21, 15, 11, 13 17 and 9, respectively with sodium sulfide followed by treatment with an acid having the appropriate anion to produce the salt desired.

Compound 43 was prepared by condensing one molar equivalent of chalcone with one molar equivalent of 4-amyloxyacetophenone in the presence of boron trifluoride etherate to produce the pyrylium fluoborate which was then treated with sodium sulfide followed by fluoboric acid.

Compound 46 was prepared by condensation of anisaldehyde with two equivalents of 4-amyloxyacetophenone in the presence of boron trifluoride etherate followed by reaction with sodium sulfide and hydrochloric acid.

Compound 50 was prepared by condensing equimolar amounts of 4,4'-dimethoxychalcone and 4-methoxyacetophenone in the presence of perchloric acid and then converting to the thiapyrylium salt.

Compound 53 was prepared by condensing equimolar amounts of 6-methyl-2,4-bis(4-ethylphenyl) pyrylium perchlorate and 4,4'-bis(dimethylamino)benzophenone.

Compound 54 was prepared as Compound 46 but substituting perchloric acid for hydrochloric acid.

Compound 56 was prepared by condensing equimolar amounts of 6-ethyl-2,4-diphenylpyrylium fluoborate and anisaldehyde.

Table VIII which follows lists additional information on the synthesis of our compounds, such as the condensing agent used, the solvent used for recrystallization of the salts, melting point found for our compounds, the percent yields obtained and the empirical formula.

TABLE VIII

| Compound number | Condensing agent | Solvent | Melting point, ° C. | Yield, percent | Empirical formula |
|---|---|---|---|---|---|
| 1 | | $CH_3CN$ | 280 | Helv. Chim. Acta. 39, 13 (1956) | |
| 2 | | $CH_3CN$ | 260 | Helv. Chim. Acta. 39, 13 (1956) | |
| 3 | $POCl_3$ | DMF $C_2H_5OH$ | 225 | 23 | $C_{23}H_{15}O_5Cl_3$ |
| 4 | $POCl_3$ | DMF $C_2H_5OH$ | >300 | 24 | $C_{23}H_{15}O_6Cl_3$ |
| 5 | $POCl_3$ | $CH_3CN$ | 300 | Helv. Chim. Acta. 39, 13 (1956) | |
| 6 | | $CH_3CN$ | 260 | Helv. Chim. Acta. 39, 13 (1956) | |
| 7 | $POCl_3$ | $Ac_2O$ | 238 | 22 | $C_{24}H_{17}O_6Cl_3$ |
| 8 | $POCl_3$ | $CH_3CN$ | 230 | 19 | $C_{32}H_{35}O_6Cl$ |
| 9 | $POCl_3$ | AcOH | 230 | 18 | $C_{30}H_{31}O_8Cl$ |
| 10 | $BF_3$ | $C_2H_5OH$ | 245 | 45 | $C_{23}H_{17}OBF_4$ |
| 11 | $BF_3$ | $CH_3CN$ $C_2H_5OH$ | 297 | | $C_{28}H_{27}O_6Cl$ |
| 12 | $BF_3$ | $C_2H_5OH$ | 310 | 46 | $C_{28}H_{27}O_2BF_4$ |
| 13 | $Ac_2O$ | $CH_3CN$ | 219 | 60 | $C_{29}H_{27}O_7Cl$ |
| 14 | $Ac_2O$ | Benzene | 194 | 69 | $C_{24}H_{37}O_3BF_4$ |
| 15 | $Ac_2O$ | $Ac_2O$ | 236 | 77 | $C_{29}H_{28}ONBF_4$ |
| 16 | $Ac_2O$ | $C_2H_5OH$ | 227 | 73 | $C_{34}H_{36}ONBF_4$ |
| 17 | $Ac_2O$ | | 282 | 90 | $C_{33}H_{28}ONBF_4$ |
| 18 | $Ac_2O$ | $C_2H_5OH$ | 146 | 67 | $C_{37}H_{37}ON_2BF_4$ |
| 19 | $Ac_2O$ | $C_2H_5OH$ | 211 | | $C_{33}H_{34}ONBF_4$ |

See footnote at end of table.

TABLE VIII—Continued

| Compound number | Condensing agent | Solvent | Melting point, ° C. | Yield, percent | Empirical formula |
|---|---|---|---|---|---|
| 20 | | | | Helv. Chim. Acta. 39, 215 (1956) | |
| 21 | $Ac_2O$ | $CH_3CN$ | 248 | 90 | $C_{35}H_{33}O_5N_2Cl$ |
| 22 | | | | Helv. Chim. Acta. 39, 216 (1956) | |
| 23 | $Ac_2O$ | $Ac_2O$ | 264 | | $C_{28}H_{26}ONBF_4$ |
| 24 | $Ac_2O$ | $CH_3OH$ | 237 | 65 | $C_{31}H_{30}ONBF_4$ |
| 25 | $Ac_2O$ | $Ac_2O$ | 290 | 55 | $C_{35}H_{33}ON_2BF_4$ |
| 26 | $Ac_2O$ | $CH_3OH$ | 239 | | $C_{30}H_{28}ONBF_4$ |
| 27 | $POCl_3$ | | >300 | | $C_{25}H_{20}O_5NCl$ |
| 28 | $POCl_3$ | BuOH | 250 | | $C_{27}H_{25}O_5Cl$ |
| 29 | | $C_2H_5OH$ | 186 | 80 | $C_{28}H_{27}OBF_4.H_2O$ |
| 30 | | AcOH | 271 | Helv. Chim. Acta. 39, 13 (1956) | |
| 31 | | AcOH | 215 | Helv. Chim. Acta. 39, 214 (1956) | |
| 32 | | $CH_3CN$ | 137 | 80 | $C_{24}H_{19}O_5ClS$ |
| 33 | | | 229 | Helv. Chim. Acta. 39, 214 (1956) | |
| 34 | | $C_2H_5OH$ | 157 | 72 | $C_{23}H_{15}O_4Cl_3S$ |
| 35 | | $Ac_2O$ | 294 | Helv. Chim. Acta. 39, 214 (1956) | |
| 36 | | BuOH | 198 | 80 | $C_{27}H_{25}OClS$ |
| 37 | | $C_2H_5OH$ | 147 | 85 | $C_{32}H_{35}O_5SCl$ |
| 38 | | $CH_3CN$ | 255 | 79 | $C_{27}H_{24}O_4NClS$ |
| 39 | | $C_2H_5OH$ | 197 | 85 | $C_{23}H_{17}SBF_4$ |
| 40 | | $C_2H_5OH$ | 187 | 70 | $C_{23}H_{18}O_4S_2$ |
| 41 | | $C_2H_5OH$ | 192 | 85 | $C_{24}H_{19}OSBF_4$ |
| 42 | | $C_2H_5OH$ | 208 | 75 | $C_{23}H_{17}SCl.3H_2O$ |
| 43 | | $C_2H_5OH$ $H_2O$ | 172 | 90 | $C_{28}H_{27}OSBF_4$ |
| 44 | | $C_2H_5OH$ | 155 | 90 | $C_{30}H_{31}O_7ClS$ |
| 45 | | $C_2H_5OH$ | 275 | 80 | $C_{28}H_{27}SO_5Cl$ |
| 46 | | $C_2H_5OH$ | 95 | 90 | $C_{34}H_{30}ClO_3S$ |
| 47 | | $CH_3CN$ | 231 | 60 | $C_{35}H_{33}O_4N_2ClS$ |
| 48 | | $C_2H_5OH$ | 201 | 85 | $C_{29}H_{28}O_4ClNS$ |
| 49 | | $CH_3CN$ | 225 | 88 | $C_{29}H_{27}O_6SCl$ |
| 50 | | | | Helv. Chim. Acta. 39, 214 (1956) | |
| 51 | | $CH_3COOH$ | 270 | | $C_{19}H_{17}OBF_4$ |
| 52 | | $C_2H_5OH$ | 215 | 50 | $C_{28}H_{27}OClS$ |
| 53 | | $Ac_2O$ | 270 | 61 | $C_{39}H_{41}O_5N_2Cl$ |
| 54 | | $C_2H_5OH+H_2O$ | 128 | 89 | $C_{34}H_{39}O_7ClS$ |
| 55 | | $C_2H_5OH$ | 166 | 80 | $C_{31}H_{31}O_3BF_4$ |
| 56 | | $C_2H_5OH$ | 170 | | $C_{28}H_{25}O_2BF_4$ |

$AcO_2$=Acetic anhydride; AcOH=Acetic acid; BuOH=Butanol; and DMF=Dimethylformamide Our invention is still further illustrated by the accompanying drawings, FIGS. 1, 2, 3, 4, 5, 6, 7 and 8. Each drawing represents a wedge spectogram for a photoresist material containing either an unsensitized polymer layer or a sensitized polymer layer.

FIG. 1 represents the wedge spectrogram for a photoresist element coated with unsensitized 2 percent poly(vinyl cinnamylideneacetate) in chlorobenzene.

FIG. 2 represents the wedge spectrogram for a photoresist element coated with 2 percent poly(vinyl cinnamylideneacetate) in chlorobenzene sensitized with 10 percent (of weight of polymer) of compound 44, 4-(4-amyloxyphenyl) - 2,6 - bis(4-methoxyphenyl)thiapyrylium perchlorate.

FIG. 3 represents the wedge spectrogram for a photoresist element coated with unsensitized 2 percent poly(vinyl cinnamate) in chlorobenzene.

FIG. 4 represents the wedge spectrogram for a photoresist element coated with 2 percent poly(vinyl cinnamate) in chlorobenzene sensitized with 10 percent (of the weight of polymer) of compound 28, 2,6-bis(4-ethylphenyl)-4-phenylpyrylium perchlorate.

FIG. 5 represents the wedge spectrogram for a photoresist element coated with unsensitized 2 percent poly(tetramethylene cinnamalmalonate) in chlorobenzene.

Figure 6:
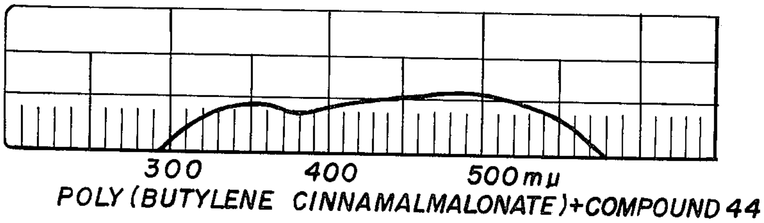

FIG. 6 represents the wedge spectrogram for a photoresist element coated with 2 percent poly(tetramethylene cinnamalmalonate) in chlorobenzene sensitized with 10 percent (of the weight of polymer) of compound 44.

Figure 7:
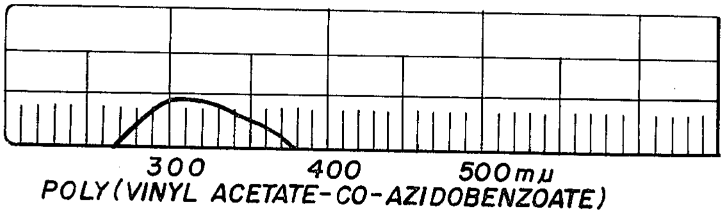

FIG. 7 represents the wedge spectrogram for a photoresist element coated with unsensitized 2 percent poly(vinyl acetate-co-azidobenzoate) in chlorobenzene.

Figure 8:
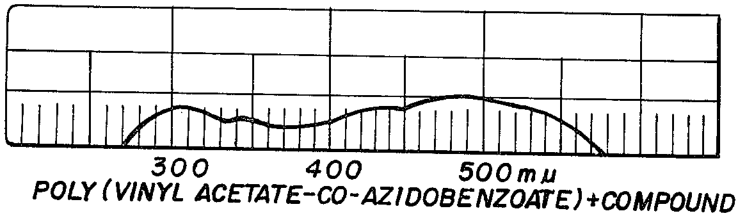

FIG. 8 represents the wedge spectrogram for a photoresist element coated with 2 percent poly(vinyl acetate-co-azidobenzoate) in chlorobenzene sensitized with 10 percent (of weight of polymer) of compound 44.

The valuable light-sensitive film-forming compositions of our invention are comprised of a polymer and a pyrylium or a thiapyrylium salt compound. These compositions are particularly valuable for coating the light sensitive layers of photoresist materials, and electrophotographic elements for both xerographic or photoconductographic processing. The pyrylium and thiapyrylium salts serve as exceptionally good sensitizers for a wide range of film-forming polymeric materials used to advantage in photoresist coatings and to sensitize photoconductors used in electrophotographic coatings. These salts are also valuable photoconductors for electrophotographic layers. The relative speeds of photoresist layers have been increased up to 140 times by the use of our pyrylium and thiapyrylium salt sensitizer compounds. Besides this the range of spectral sensitivity has been extended in the direction of longer wavelengths. The range of spectral sensitivity of some light-sensitive polymers has been tripled by our sensitizers. Even non-light-sensitive polymers are used to advantage in photoresist elements when sensitized with our pyrylium and thiapyrylium salt compounds. Electrophotographic elements using zinc oxide as the photoconductor have speeds by xerographic processing that are increased as much as 21 times by the addition of pyrylium or thiapyrylium salts as sensitizers. Xerographic speeds for photoconductor layers containing an organic photoconductor such as polyvinyl carbazole are increased up to about 8,700 times when our sensitizers are used. Photoconductor layers containing some of our pyrylium and thiapyrylium salts as photoconductors per se have photoelectric speeds that are up to 130 times faster than a photoconductor layer using polyvinylcarbazole as the photoconductor. The valuble characteristics of our light-sensitive film-forming compositions are greatly enhanced by the wide range of utility shown.

The invention has been described in detail with particular reference to preferred embodiments thereof, but it will be understood that variations and modifications can be effected within the spirit and scope of the invention as described hereinabove and as defined in the appended claims.

We claim:

1. An electrophotographic method using a photoconductive element having thereon a photoconductive, electrically insulating layer consisting essentially of a film-forming, electrically insulating resin binder and dispersed in said binder a member selected from the group conststing of pyrylium, thiapyrylium, and selenapyrylium salts, said method comprising the steps of
   (A) imposing a uniform electrostatic charge on the surface of said insulating layer,
   (B) exposing the charged surface to a light pattern to dissipate the charge only in light-struck, photoconductive areas thereby forming an electrostatic image on said surface, and
   (C) developing a visible image by means of the electrostatic image so formed.

2. An improved photosensitive element comprising a support and coated thereon a layer of photopolymerizable resin having dispersed therein a sensitizing amount of a member selected from the group consisting of pyrylium, thiapyrylium, and selenapyrylium salts.

3. An improved photosensitive element comprising a support and coated thereon a layer of photoconductive electrically insulating material having dispersed therein a sensitizing amount of a member selected from the group consisting of pyrylium, thiapyrylium, and selenapyrylium salts.

4. An improved photosensitive element comprising a support and coated thereon a photoconductive layer of electrically insulating, film-forming resin binder having dispersed therein at least one photoconductive compound including a salt selected from the group consisting of pyrylium, thiapyrylium and selenapyrylium salts.

5. An improved photosensitive element as defined in claim 4 wherein said electrically insulating resin binder has dispersed therein photoconductive zinc oxide and a sensitizing amount of said salt.

6. An improved photosensitive element comprising a support and coated thereon a photoconductive, electrically insulating layer consisting essentially of an insulating, film-forming resin binder and dispersed therein, in an amount sufficient to render said layer photoconductive, a salt selected from the group consisting of pyrylium, thiapyrylium, and selenapyrylium salts.

7. A film-forming composition comprising poly(butylene cinnamalmalonate) and 4-(4-amyloxyphenyl)-2,6-bis(4-methoxyphenyl)thiapyrylium perchlorate.

8. A film-forming composition comprising poly(vinyl acetate-co-azidobenzoate) and 2,6-bis(4-ethylphenyl)-4-(4-amyloxyphenyl)thiapyrylium perchlorate.

9. A film-forming composition comprising poly(vinyl acetate-co-azidobenzoate) and 2,4,6-tri(4-methoxyphenyl) thiapyrylium perchlorate.

10. A film-forming composition comprising poly(n-butyl/isobutyl methacrylate), zinc oxide and 2-[$\beta$,$\beta$-bis(4-dimethylaminophenyl)vinylene] - 4,6 - diphenylthiapyrylium perchlorate.

11. A film-forming composition comprising poly(n-butyl/isobutyl methacrylate), zinc oxide and 2,6-bis(4-dimethylaminostyryl)-4-phenylpyrylium perchlorate.

References Cited by the Examiner

UNITED STATES PATENTS

| | | | |
|---|---|---|---|
| 2,461,484 | 2/1949 | Thompson | 96—84 |
| 2,791,504 | 5/1957 | Plambeck | 96—84 |
| 2,811,510 | 10/1957 | Leubner et al. | 96—1 |
| 2,956,878 | 10/1960 | Michiels et al. | 96—1 |

FOREIGN PATENTS

| | | |
|---|---|---|
| 562,336 | 5/1958 | Belgium. |
| 1,105,713 | 4/1961 | Germany. |

NORMAN G. TORCHIN, *Primary Examiner.*

R. L. STONE, C. BOWERS, *Assistant Examiners.*